(12) United States Patent

Wakatabe et al.

(10) Patent No.: US 9,112,371 B2
(45) Date of Patent: Aug. 18, 2015

(54) REFRESH CHARGING METHOD FOR AN ASSEMBLED BATTERY CONSTITUTED FROM A PLURALITY OF LEAD-ACID STORAGE BATTERIES AND CHARGING APPARATUS

(75) Inventors: Hiroyuki Wakatabe, Mie (JP); Shinichi Sano, Mie (JP); Katsura Mitani, Nara (JP)

(73) Assignee: SHIN-KOBE ELECTRIC MACHINERY CO., LTD., Tokyo (JP)

( * ) Notice: Subject to any disclaimer, the term of this patent is extended or adjusted under 35 U.S.C. 154(b) by 191 days.

(21) Appl. No.: 13/824,644

(22) PCT Filed: Sep. 3, 2012

(86) PCT No.: PCT/JP2012/072357
§ 371 (c)(1),
(2), (4) Date: Mar. 18, 2013

(87) PCT Pub. No.: WO2014/033952
PCT Pub. Date: Mar. 6, 2014

(65) Prior Publication Data
US 2014/0340050 A1 Nov. 20, 2014

(51) Int. Cl.
*H02J 7/04* (2006.01)
*H02J 7/00* (2006.01)
(Continued)

(52) U.S. Cl.
CPC ............. *H02J 7/007* (2013.01); *H01M 10/441* (2013.01); *H01M 10/486* (2013.01);
(Continued)

(58) Field of Classification Search
CPC .................. H02J 7/007; H02J 7/0073
USPC ......... 320/155, 152, 128, 132, 134, 136, 157, 320/159, 162, 164, 133, 137, 149
See application file for complete search history.

(56) References Cited

U.S. PATENT DOCUMENTS 4,609,861 A * 9/1986 Inaniwa et al. ............. 320/152
5,237,259 A * 8/1993 Sanpei ....................... 320/158

FOREIGN PATENT DOCUMENTS

JP 04-183232 6/1992
JP 05-030667 2/1993
(Continued)

*Primary Examiner* — Richard Isla Rodas
*Assistant Examiner* — Mohammed Jameel Sharief
(74) *Attorney, Agent, or Firm* — Fitch, Even, Tabin and Flannery LLP (57) ABSTRACT

Provided are a refresh charging method and a refresh charging apparatus for an assembled battery constituted from lead-acid storage batteries, by which a necessary charging rate may be performed while shortening a charging period. In a constant voltage charging mode, n intermediate threshold values $S_1$ to $S_n$ which decrease stepwise are set between a predetermined threshold value $S_0$ and a lower-limit current value, and n additional timer periods $T_1$ to $T_n$ are set where n is an integer equal to or larger than one. Counting of the n additional timer periods $T_1$ to $T_n$ is respectively started when the charging current reaches the n intermediate threshold values $S_1$ to $S_n$. A maximum timer period $T_m$ and the n additional timer periods $T_1$ to $T_n$ are set to satisfy a relationship of $T_m > T_1 > \ldots > T_n$. Charging is stopped when the counting of one of the maximum timer period $T_m$ and the n additional timer periods $T_1$ to $T_n$ is completed before the lower-limit current value is detected.

6 Claims, 5 Drawing Sheets (51) Int. Cl.
  *H02J 7/16* (2006.01)
  *H02J 7/02* (2006.01)
  *H01M 10/44* (2006.01)
  *H01M 10/48* (2006.01)

(52) U.S. Cl.
  CPC ............ *H02J 7/0029* (2013.01); *H02J 7/0077* (2013.01); *H02J 7/02* (2013.01); *H02J 7/04* (2013.01); *H02J 7/0047* (2013.01); *H02J 7/0052* (2013.01)

(56) References Cited

FOREIGN PATENT DOCUMENTS

| | | |
|---|---|---|
| JP | 2002-315216 | 10/2002 |
| JP | 2010-020906 | 1/2010 |

\* cited by examiner

REFRESH CHARGING METHOD FOR AN ASSEMBLED BATTERY CONSTITUTED FROM A PLURALITY OF LEAD-ACID STORAGE BATTERIES AND CHARGING APPARATUS

TECHNICAL FIELD

The present invention relates to a refresh charging method and a refresh charging apparatus for an assembled battery constituted from a plurality of lead-acid storage batteries, configured to completely charge the assembled battery. The plurality of lead-acid storage batteries are used for a vehicle equipped with an idle stop and start system (hereinafter referred to as an "ISS system") and new energy applications such as solar power generation and wind power generation, and are generally used in a lower charged state than a fully-charged state.

BACKGROUND ART

Traditionally, a lead-acid storage battery has been used for a vehicle battery or an industrial battery against an instantaneous voltage drop when a power failure occurs at an office building, a hospital, or the like. Recently, a vehicle that has adopted the ISS system has been marketed in the automobile industry. In the ISS system, while the vehicle stops due to a traffic signal or the like, the engine of the vehicle is temporarily stopped, and the lead-acid storage battery is used as a power source during the stop of the vehicle or a power source for restarting the engine when the vehicle starts moving. It has also been studied that electric power generated by the use of natural energy obtained by the solar power generation, the wind power generation, or the like is regulated by the lead-acid storage battery, or energy obtained by the power generation is temporarily stored in the lead-acid storage battery to use as power for an electric vehicle or the like.

In a system using the lead-acid storage battery for the above-mentioned ISS system or the above-mentioned applications of the solar power generation and the wind power generation, electric power is generated by a power generator (such as an engine power generator for a vehicle, a solar battery, or a wind power generator), and the electric power obtained by the power generation is converted to direct current by a converter to charge the lead-acid storage battery. On the contrary, when discharging is performed from the lead-acid storage battery, electric power is converted to alternating current by an inverter, and is then supplied to a load.

The lead-acid storage battery to be used in this manner has a characteristic that, when the lead-acid storage battery in a fully-charged state is to be further charged, water in the electrolyte of the lead-acid storage battery is decomposed by a charging current. Thus, it is a practice to use the lead-acid storage battery in a charged state (that is commonly referred to as a State Of Charge. Hereinafter referred to as "SOC") set to a lower state (e.g., SOC: 60%) than the fully-charged state so as not to waste generated electric power. When the lead-acid storage battery is used for a long time by this usage, crystals of lead sulfate generated in a negative-electrode active material inside the lead-acid storage battery coarsen. Thus, the crystals are not dissolved even if the lead-acid storage battery is charged. Then, these crystals of lead sulfate are accumulated to bring about deterioration of the lead-acid storage battery. As a result, the life of the lead-acid storage battery is shortened. Further, a plurality of the lead-acid storage batteries are connected in series for use. Consequently, a variation occurs in the amount of the crystals of lead sulfate that are not dissolved, for each battery.

So-called "refresh charging" (that may also be referred to as "equalizing charging") is performed in order to solve this problem (refer to JP 2010-020906 A [Patent Document 1], for example). In this refresh charging, each of the lead-acid storage batteries connected in series is charged to a completely-charged state (SOC: 100%, or the fully-charged state) for each given period to remove lead sulfate accumulated in the negative-electrode active material.

The charging method described in Patent Document 1 is characterized in that, after each lead-acid storage battery has been charged with a constant current until the voltage of the lead-acid storage reaches a set voltage (E), charging with the set voltage (E) is continued until a charging current reaches a set current value or less.

PRIOR ART DOCUMENTS

Patent Documents

Patent Document 1: JP 2010-020906 A

SUMMARY OF INVENTION

Technical Problem

In the charging method in Patent Document 1, however, the set voltage, the value of the charging current, and a charging period must be finely managed. Thus, there is a problem that a control apparatus to be provided together with the lead-acid storage batteries will get complicated.

There is also a problem that the charging period will increase because it is necessary to continue charging until the current value reaches the certain value or less.

An object of the present invention is to provide a refresh charging method and a refresh charging apparatus for an assembled battery constituted from lead-acid storage batteries, capable of obtaining a necessary charging rate even if a charging period is shortened.

Another object of the present invention is to provide a refresh charging method and a refresh charging apparatus for an assembled battery constituted from lead-acid storage batteries in which control over a set voltage, a charging current value, and a charging period is more simplified than in conventional refresh charging.

Solution to Problem

The present invention is a refresh charging method for an assembled battery constituted from a plurality of lead-acid storage batteries, configured to completely charge the assembled battery. The plurality of lead-acid storage batteries are generally used in a lower charged state than a fully-charged state. The method comprises the steps of:

performing a constant current charging mode of charging the assembled battery with a constant current until a voltage of the assembled battery reaches a predetermined set voltage;

switching the charging mode from the constant current charging mode to a constant voltage charging mode;

performing the constant voltage charging mode operable to charge the assembled battery with a constant voltage when it is detected that the voltage of the assembled battery has reached the predetermined voltage; and stopping charging, in the constant voltage charging mode, when timer counting for a maximum timer period Tm is completed or when it is detected that a charging current reaches a lower limit current value for the charging current lower than a predetermined threshold value S0, wherein the timer counting for the maximum timer period Tm is started after the charging current reaches the predetermined threshold value S0; the maximum timer period Tm is predetermined based on testing as a time period which can be estimated to be required to completely charge the assembled battery by continuing to charge the assembled battery even after the charging current has reached the predetermined threshold value S0 on an assumption that each lead-acid storage battery in the assembled battery does not reach an end of life thereof; and the lower limit value for the charging current is predetermined based on testing as a current level at which it can be estimated that the lead-acid storage batteries are in a completely charged state.

In the constant voltage charging mode in the present invention, n (n being an integer equal to or larger than one) intermediate threshold values $S_1$ to $S_n$ which decrease stepwise are set between the predetermined threshold value $S_0$ and the lower limit current value, and n additional timer periods $T_1$ to $T_n$ are set. Counting of the n additional timer periods $T_1$ to $T_n$ is respectively started when the charging current reaches the n intermediate threshold values $S_1$ to $S_n$. The n additional timer periods $T_1$ to $T_n$ are set to satisfy a relationship of $T_m > T_1 > \ldots > T_n$ as timer periods respectively estimated to be required for the lead-acid storage batteries to come into the completely-charged state when the charging is continued even after the charging current has reached the respective intermediate threshold values. The charging is stopped when the counting of one of the maximum timer period $T_m$ and the n additional timer periods is completed before the lower-limit current value is detected.

In the present invention, a relationship between the charging current and a charging period is determined based on a relationship among a charging current, a charging period, and the charging rate of lead-acid storage batteries when a standard assembled battery is charged. That is, the relationship between the charging current and the charging period is determined based on data indicating that a charging rate may be sufficiently ensured when the charging current has reached a certain threshold value and then the remainder of the charging period is set to a certain period. Then, using this relationship between the charging current and the charging period, the additional timer periods are set, in addition to the maximum timer period. The additional timer periods are set stepwise as the charging current decreases during the constant voltage charging mode. By setting the timer in this manner, the charging rate that is necessary may be obtained even if the charging period is shortened more than in the related art. Further, charging is controlled by the charging current and the charging period (timer). Thus, the need for complex control as in the prior art is eliminated.

The intermediate threshold values may be arbitrarily set. Arbitrary current values may be set to the intermediate threshold values, the intermediate values may be set at regular intervals from the threshold value $S_0$, or the intermediate threshold values may be set to equally divide between the threshold value $S_0$ and the lower-limit current value.

In the present invention, a relationship among the maximum timer period and the n additional timer periods are set to satisfy the relationship of $T_m > T_1 > \ldots > T_n$. However, depending on the state of the assembled battery, the charging current is expected to show a tendency different from that of the standard assembled battery. The maximum timer period $T_m$ may therefore have elapsed before the additional timer period $T_1$ that has been set elapses. In this case, when the elapse of the additional timer period $T_1$ is waited for, the charging period will increase more than in the method of the related art. Thus, in the present invention, it is so arranged that charging is stopped when counting of one of the maximum timer period $T_m$ and the n additional timer periods $T_1$ to $T_n$ is completed. Consequently, according to the present invention, the charging period may be shortened more than in the related art.

When the predetermined threshold value $S_0$ and the n intermediate threshold values $S_1$ to $S_n$ are each indicated by a current value $S_x$ [CA] and the maximum timer period $T_m$ and the n additional timer periods $T_1$ to $T_n$ are each indicated by a period $T_x$ [h], the predetermined threshold value $S_0$, the n intermediate threshold values $S_1$ to $S_n$, the maximum timer period $T_m$, and the n additional timer periods $T_1$ to $T_n$ are defined to satisfy the following relational equation:

$$T_x = (0.9 \pm 0.05) \ln(S_x) + (14.7 \pm 0.05).$$

This relational equation is a relational equation based on data obtained from charging and discharging experiments performed on the standard assembled battery. The n intermediate threshold values $S_1$ to $S_n$ and the n additional timer periods $T_1$ to $T_n$ may be of course determined using a different relational equation.

The current value [CA] is a unit when a current value for charging or discharging the capacity of the rechargeable battery in one hour is defined to be 1CA.

In the present invention, an abnormal condition of the lead-acid storage batteries to be charged may also be detected. To take an example, when charging is not completed (the lower-limit current value is not attained even if the constant voltage charging in the constant voltage charging mode has been started) even if a long period (e.g., 24 hours) has elapsed since the start of charging, it is highly likely that one or more of the lead-acid storage batteries are in an abnormal condition. For that reason, when the counting is started simultaneously with a start of the charging operation and then the charging operation is continued even after counting of a limit timer period longer than the maximum timer period $T_m$ set in advance has been completed, it may be determined that one or more of the lead-acid storage batteries are in an abnormal condition, and an alarm signal may be then generated.

When the lower-limit current value is attained in a short period (e.g., one hour) after the start of the charging, it is highly likely that the entire assembled battery has deteriorated to reach the end of life thereof. For that reason, when a period taken for the charging current to reach the lower limit current value after the charging with the constant voltage has been started in the constant voltage charging mode is equal to or less than a minimum timer period shorter than each of the additional timer periods, it may be determined that the lead-acid storage batteries have reached the ends of lives thereof, and an alarm signal may be then generated.

Further, when excessive heat is generated in the lead-acid storage batteries during the charging, it is highly likely that some abnormal condition has occurred. For that reason, a temperature measuring device operable to measure a surface temperature of a battery case of at least one of the lead-acid storage batteries may be prepared. When the temperature measuring device measures a predetermined temperature, it may be determined that the at least one of the lead-acid storage batteries are in an abnormal condition, and an alarm signal may be then generated.

An arbitrary process may, however, be performed upon receipt of the alarm signal. To take an example, charging may be stopped, and then a lamp showing an error may be illuminated. Alternatively, when remote control is being performed, an error may be of course notified to a remote location.

The present invention may also be regarded as a charging apparatus for an assembled battery constituted from a plurality of lead-acid storage batteries, configured to completely charge the assembled battery, the plurality of lead-acid storage batteries being generally used in a lower charged state than a fully-charged state. The charging apparatus is operable to execute the above-mentioned charging method and comprises a charging circuit configured to:

perform a constant current charging mode of charging the assembled battery with a constant current until a voltage of the assembled battery reaches a predetermined set voltage; and switch the charging mode from the constant current charging mode to a constant voltage charging mode when it is detected that the voltage of the assembled battery has reached the predetermined voltage.

DESCRIPTION OF EMBODIMENTS

A refresh charging method and a refresh charging apparatus for an assembled battery constituted from lead-acid storage batteries according to the present invention will be explained below with reference to drawings.

Figure 1:
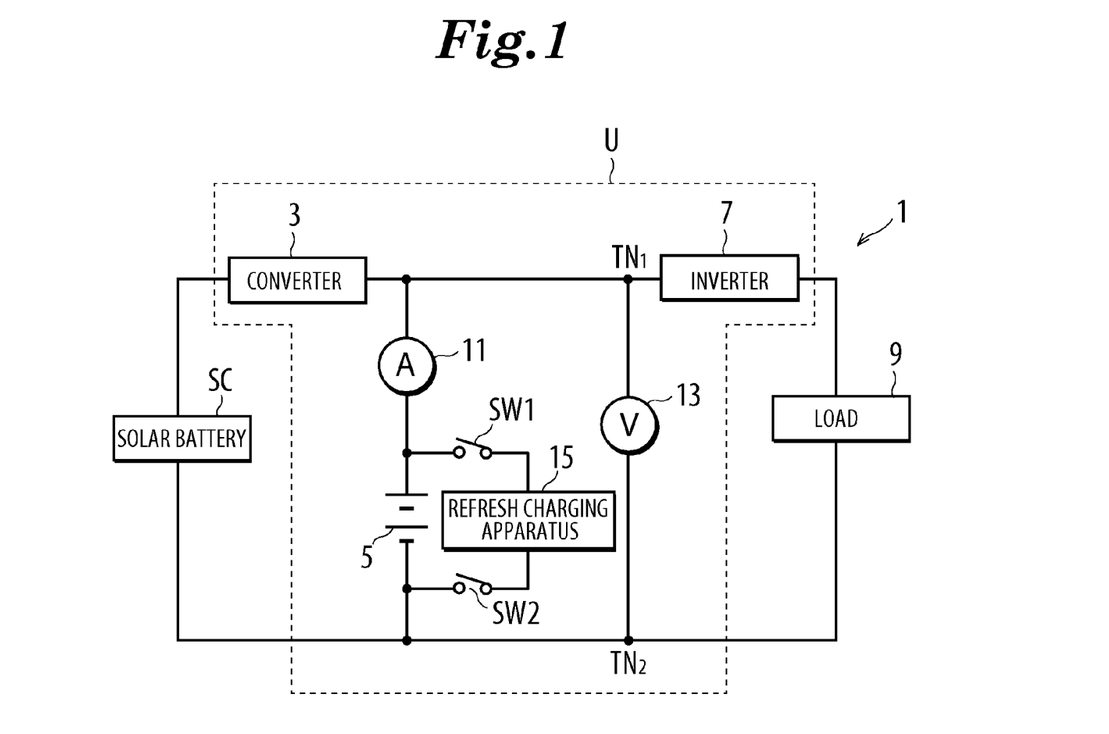
FIG. 1 is a circuit diagram of a power generation system into which a refresh charging apparatus and an assembled battery, which is constituted from lead-acid storage batteries and is a target to be refresh-charged, are incorporated.
Figure 2:
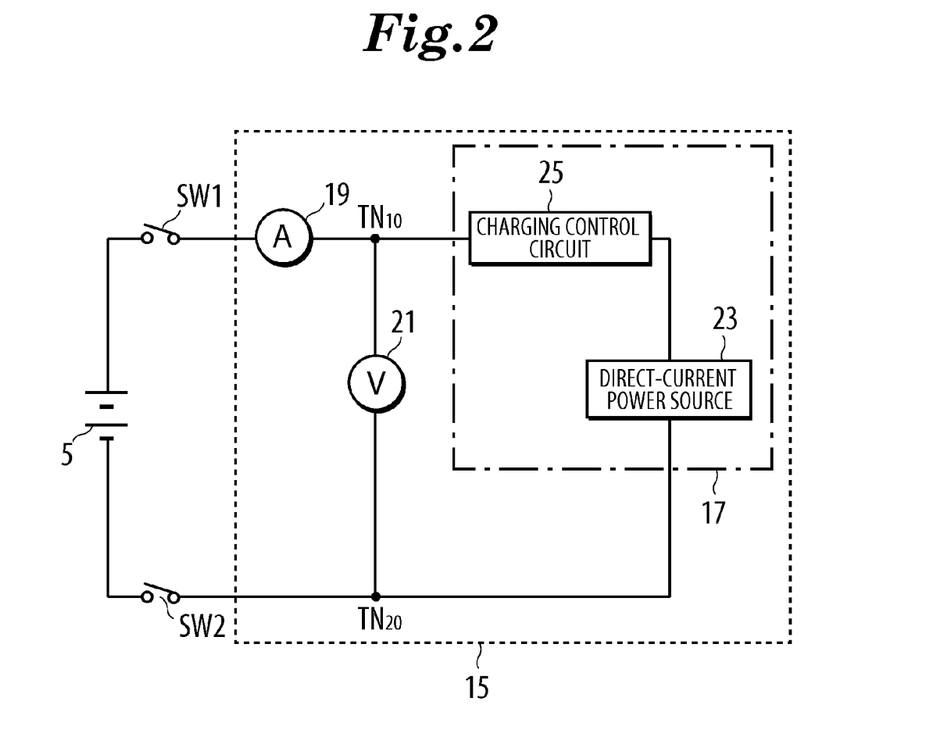
FIG. 2 is a circuit diagram of the refresh charging apparatus in this embodiment.

FIG. 1 is a circuit diagram of a power generation system 1 in this embodiment into which the assembled battery that is constituted from the lead-acid storage batteries and is a target to be refresh-charged is incorporated. FIG. 2 is a circuit diagram showing only the assembled battery and the refresh charging apparatus. A solar battery SC is connected in parallel with an assembled battery 5 constituted from the lead-acid storage batteries through a converter 3 connected in series with the solar battery SC. The assembled battery 5 is connected in parallel with a load 9 connected in series with an inverter 7. The load 9 is a system, for example. The assembled battery 5 is installed in order to smooth an output of the solar battery SC that varies according to a condition such as the weather and then to connect the output of the solar battery to the system. A charged/discharged current from the assembled battery 5 is measured by an ammeter 11 connected in series with the assembled battery 5. A charged/discharged voltage from the assembled battery 5 is measured by a voltmeter 13 connected between input/output sections $TN_1$ and $TN_2$. The converter 3 adjusts the charge/discharged current and the charged/discharged voltage, based on this measurement by the ammeter and this measurement by the voltmeter. The assembled battery 5 is formed by connecting 24 cells of 2V-100 Ah lead-acid storage batteries in series. As shown in an enclosure by a dotted line in FIG. 1, a battery unit U is mainly constituted by the converter 3, the assembled battery 5, and the inverter 7.

During normal operation, charging and discharging of each of the lead-acid storage batteries constituting the assembled battery 5 are adjusted such that an SOC (State of Charge) [which is a battery capacity that may be actually used when the fully-charged state of the battery is set to 100%] is about 60%. When the lead-acid storage battery is used by such a usage, crystals of lead sulfate are accumulated in a negative-electrode active material. Then, refresh charging is performed in order to remove the accumulated crystals of lead sulfate. The refresh charging is not therefore performed during the normal operation, but is performed in a state where charging from the solar battery SC and power feeding to the load are stopped.

A refresh charging apparatus 15 is constituted from a charging circuit 17, an ammeter 19, and a voltmeter 21 in order to charge the assembled battery 5. The charging circuit 17 is constituted from a direct-current power source 23 and a charging control circuit 25 operable to control a charging current and a charging voltage based on values of detection by the ammeter 19 and the voltmeter 21. The voltmeter 21 is connected in parallel with input/output sections $TN_{10}$ and $TN_{20}$ of the charging circuit 17. Further, the ammeter 19 is connected in series with the charging circuit 17. By closing switches SW1 and SW2 when performing the refresh charging, the assembled battery 5 may be charged.

Figure 3:
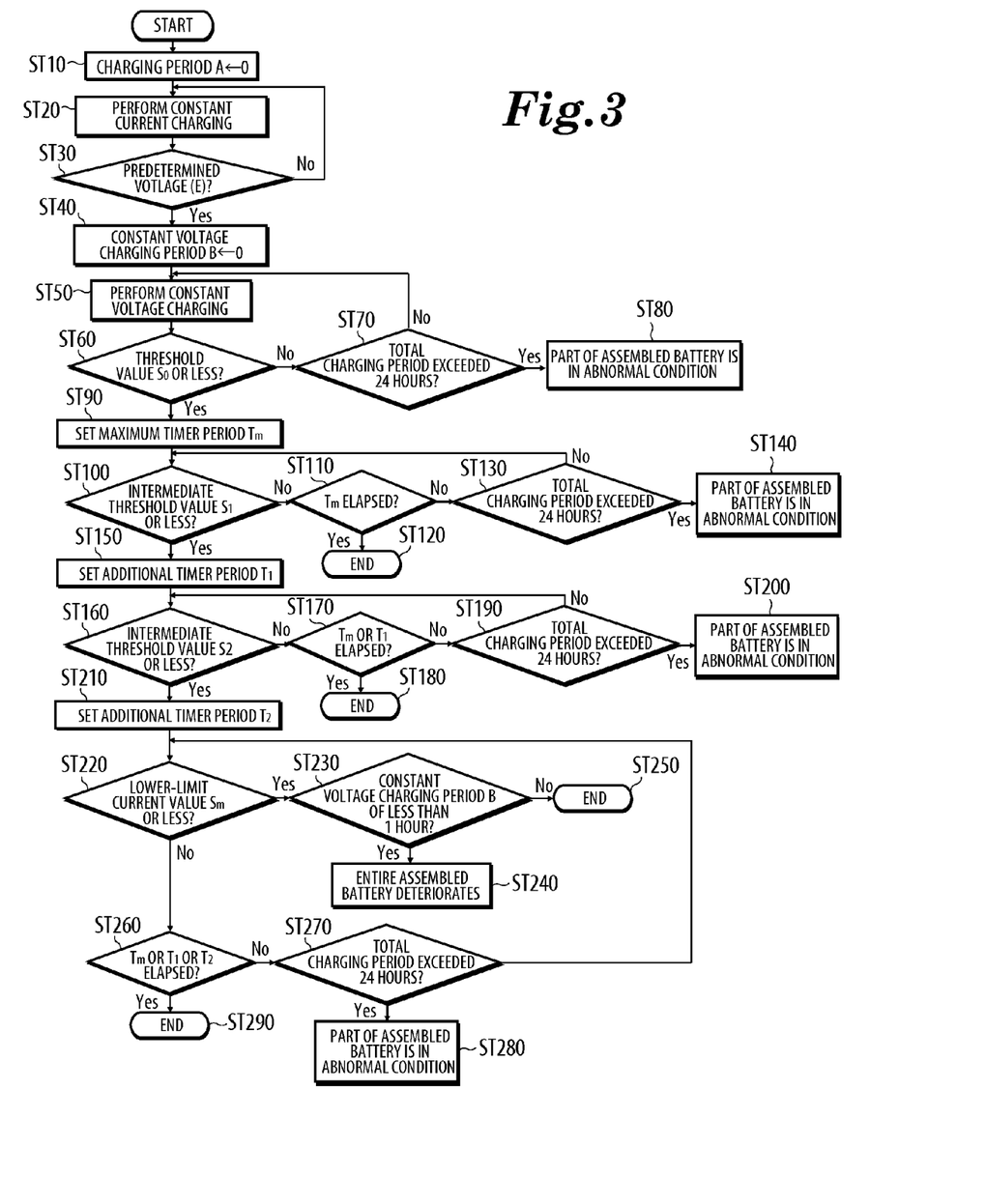
FIG. 3 is a flowchart showing a flow of refresh charging in the embodiment of the present invention.
Figure 4A:
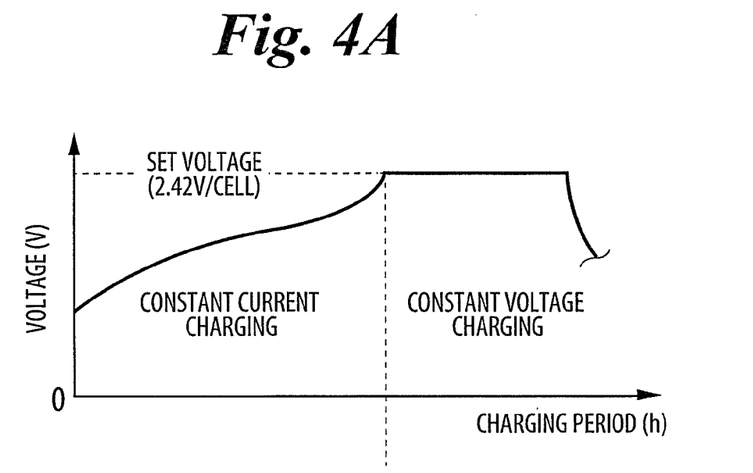
FIG. 4A is a graph showing a relationship between a charging period [h] and a charging voltage [V] when the refresh charging in the embodiment of the present invention is performed.
Figure 4B:
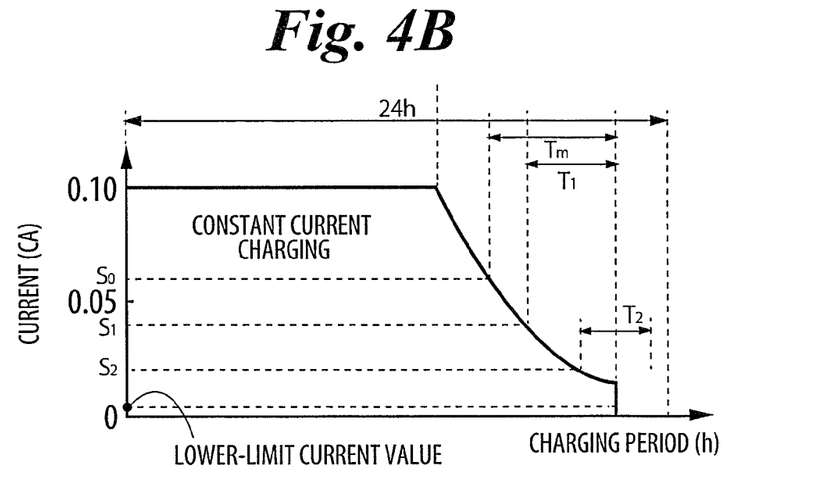
FIG. 4B is a graph showing a relationship between the charging period [h] and a charging current [CA].

The refresh charging is performed by the charging control circuit 25 to be controlled by a microcomputer not shown, according to a flowchart in FIG. 3. FIGS. 4A and 4B are graphs respectively showing examples of a relationship between a charging period [h] and a charging voltage [V] and a relationship between the charging period [h] and a charging current [CA] when the standard assembled battery 5 is charged by the refresh charging apparatus 15 that performs the refresh charging method of the present invention.

When the switches SW1 and SW2 are turned on and the refresh charging is then started, in a computer program configured to control a charging control circuit 25, "0" is input to a charging period A and counting the charging period is started (in step ST10). Then, a constant current charging mode is performed with a current of 0.1 CA until a set voltage E (2.42 V/cell) is attained (in step ST20). When the charging control circuit 25 detects that the set voltage E has been attained (in step ST30), the charging control circuit 25 switches the charging mode to perform a constant voltage charging mode operable to charge the assembled battery with a constant voltage. In the computer program configured to the charging control circuit 25, "0" is input to a constant voltage charging period B and counting the constant voltage charging period is started (in step ST40). By performing constant voltage charging in step ST50, the charging current gradually decreases as the charging proceeds, as shown in FIG. 4B.

Little decrease of the charging current or a slow decreasing speed of the charging current means that the charging is not normally performed and the charging current has changed to heat, or that a part or all of the lead-acid storage batteries constituting the assembled battery are in an abnormal condition. Also, too high decreasing speed means that a part or all of the lead-acid storage batteries constituting the assembled battery are in an abnormal condition. Then, from these standpoints, this embodiment is so arranged that an abnormal condition of the assembled batteries may be detected by refresh charging. This arrangement will be described later.

The charging control circuit 25 determines whether or not the charging current has reached a threshold value $S_0$ (0.06

CA) or less, in step ST60. When the charging control circuit 25 determines that the charging current has not reached the threshold value $S_0$ or less, the charging control circuit 25 determines whether or not the total charging period A is 24 hours (in step ST70). The total charging period A of "24 hours" is set because in this embodiment, it has been proved by a test that charging of a normal assembled battery is completed in 24 hours even if the charging has been started in a state where there is no amount of charge in the assembled battery. This period is not, however, limited to 24 hours. When it is determined that the total charging period is within 24 hours, the procedure is returned to step ST50 and step ST60 to continue the charging. When it is determined that the total charging period A has exceeded 24 hours before the charging current reaches the threshold value $S_0$, it is highly likely that one or more of the lead-acid storage batteries constituting the assembled battery 5 are in an abnormal condition. Then, in this embodiment, it is so set in this case that the charging control circuit 25 generates an alarm signal to stop the charging, and then notifies the abnormal condition in a part of the assembled battery by illuminating a lamp not shown (in step ST80).

When the charging current decreases to reach the threshold value $S_0$ or less, a maximum timer period $T_m$ is set (in step ST90). In this embodiment, a threshold value $S_x$ and a timer period $T_x$ are defined to satisfy the following relational equation:

$$T_x = 0.8923 \ln(S_x) + 14.702 \qquad \text{Equation (1)}$$

where $S_x$ is a current value [CA], and $T_x$ is a timer period [h].

This relational equation is a relational equation based on data obtained from charging and discharging experiments performed on a standard assembled battery. Intermediate threshold values and additional timer periods, which will be described later, are set using the same Equation (1). In this embodiment, 0.06 CA is set as the threshold value $S_0$, while the maximum timer period $T_m$ is derived from the following relational equation, and is set to 12.2 [h].

$$T_m = 0.8923 \ln(S_0) + 14.702$$

The charging control circuit 25 determines whether or not the charging current has reached an intermediate threshold value $S_1$ (0.04 CA) or less, in step ST100. When the charging control circuit 25 determines that the charging current has not reached the intermediate threshold value $S_1$ or less, the charging control circuit 25 determines whether or not the maximum timer period $T_m$ has elapsed (in step ST110). When it is determined that the maximum timer period $T_m$ has elapsed, the charging may be determined to have been completed. Thus, the charging control circuit 25 ends charging (in step ST120). When it is determined that the maximum timer period $T_m$ has not elapsed, the charging control circuit 25 determines whether or not the total charging period A is 24 hours (in step ST130). When it is determined that the total charging period A is within 24 hours, the procedure is returned to step ST100 to continue the charging. When it is determined that the total charging period A has exceeded 24 hours, the charging control circuit 25 generates an alarm signal to stop the charging. Then, the charging control circuit 25 notifies an abnormal condition in a part of the assembled battery by illuminating the lamp not shown (in step ST140).

When the charging current decreases and then reaches the intermediate threshold value $S_1$ (0.04 CA) or less, an additional timer period $T_1$ is set (in step ST150). The additional timer period $T_1$ is derived from the following relational equation based on Equation (1), as described above. The additional timer period $T_1$ of 11.8 [h], which is shorter than the maximum timer period $T_m$, is set.

$$T_1 = 0.8923 \ln(S_1) + 14.702$$

In step ST160, the charging control circuit 25 determines whether or not the charging current has reached an intermediate threshold value $S_2$ (0.02 CA) or less. When the charging control circuit 25 determines that the charging current has not reached the intermediate threshold value $S_2$ or less, the charging control circuit 25 determines whether or not the maximum timer period $T_m$ or the additional timer period $T_1$ has elapsed (in step ST170). When it is determined that the maximum timer period $T_m$ or the additional timer period $T_1$ has elapsed, the charging may be determined to have been completed. Thus, the charging control circuit 25 ends the charging (in step ST180). When it is determined that neither the maximum timer period $T_m$ nor the additional timer period $T_1$ has elapsed, the charging control circuit 25 determines whether or not the total charging period A is 24 hours (in step ST190). When it is determined that the total charging period is within 24 hours, the procedure is returned to step ST160 to continue the charging. When it is determined that the total charging period A has exceeded 24 hours, the charging control circuit 25 generates an alarm signal and stops the charging. Then, the charging control circuit 25 notifies an abnormal condition in a part of the assembled battery by illuminating the lamp not shown (in step ST200).

When the charging current decreases and then reaches the intermediate threshold value $S_2$ (0.02 CA) or less, an additional timer period $T_2$ is set (in step ST210). The additional timer period $T_2$ is derived from the following relational equation based on Equation (1), as described above. The additional timer period $T_2$ of 11.2 [h], which is shorter than the additional timer period $T_1$, is set.

$$T_2 = 0.8923 \ln(S_2) + 14.702$$

The charging control circuit 25 determines whether or not the charging current has reached a lower-limit current value $S_m$ (0.003 CA) or less, in step ST220. When it is determined that the charging current has reached the lower-limit current value Sm or less, the charging control circuit 25 determines whether or not the constant voltage charging period B is less than one hour (in step ST230). When it is determined that the constant voltage charging period B is less than one hour, a period where the charging current has decreased is too short. Thus, it is highly likely that the entire assembled battery 5 has deteriorated to an extent that the charging cannot be normally performed. Thus, in this embodiment, it is so set in this case that the charging control circuit 25 generates an alarm signal and stops the charging, and then the charging control circuit 25 notifies the deterioration of the entire assembled battery by illuminating the lamp not shown (in step ST240). When it is determined that the constant voltage charging period B is equal to or larger than one hour, the charging may be determined to have been normally completed. Thus, the charging control circuit 25 ends the charging (in step ST250).

When it is determined that the charging current has not reached the lower-limit current value Sm or less, the charging control circuit 25 determines whether or not the maximum timer period $T_m$, the additional timer period $T_1$, or the additional timer period $T_2$ has elapsed (in step ST260). When it is determined that none of the maximum timer period $T_m$, the additional timer period $T_1$, and the additional timer period $T_2$ have elapsed, the charging control circuit 25 determines whether or not the total charging period A is 24 hours (in step ST270). When it is determined that the total charging period A is within 24 hours, the procedure is returned to step ST220 to continue the charging. When it is determined that the total charging period A has exceeded 24 hours, the charging control circuit generates an alarm signal and stops the charging. Then, the charging control circuit notifies an abnormal condition in a part of the assembled battery by illuminating the lamp not shown (in step ST280). When it is determined that one of the maximum timer period $T_m$, the additional timer period $T_1$, and the additional timer period $T_2$ has elapsed, the charging may be determined to have been completed. Thus, the charging control circuit 25 ends the charging (in step ST290).

Examples of comparison between this embodiment and a method and an apparatus of each related art will be shown below.

The refresh charging apparatus 15 used in embodiment examples is as shown in FIG. 2. The assembled battery 5 constituted from the 24 cells of 2V-100 Ah lead-acid storage batteries connected in series was used for each of the embodiment examples. The assembled battery used for this comparison was refresh-charged from a state of the SOC of 70% using a constant charging current value of 0.1 CA and the set voltage E of 2.42 V. Threshold values ($S_0$, $S_1$, $S_2$, $S_m$), timer periods ($T_m$, $T_1$, $T_2$), and a total charging period A that are the same as those in the above-mentioned example were set (for details, refer to Table 1).

Embodiment Example 1

In embodiment example 1, a brand-new unused battery as a battery (a). In this example, charging was ended with the charging period of 4.1 hours. The charging rate in this case was 28% with respect to the rated capacity of the battery (a).

Embodiment Example 2

In embodiment example 2, a battery, which had been used for 1000 cycles, was used, as a battery (b). In this example, charging was ended with the charging period of 6.3 hours. The charging rate in this case was 38% with respect to the rated capacity of the battery (b).

Embodiment Example 3

In embodiment example 3, a battery, which had been used for 2000 cycles, was used as a battery (c). In this example, charging was ended with the charging period of 7.9 hours. The charging rate in this case was 33% with respect to the rated capacity of the battery (c).

Embodiment Example 4

In embodiment example 4, a battery, which had been used for 3000 cycles, was used as a battery (d). In this example, charging was ended with the charging period of 12.9 hours. The charging rate in this case was 23% with respect to the rated capacity of the battery (d).

In comparative examples, a flowchart of the charging method disclosed in the afore-mentioned Patent Document 1 was used to perform charging. A threshold value S, charging periods $T_1$ and $T_2$ are as shown in Table 2. The charging period $T_2$ is set to be repeated three times at a maximum.

Related Art Example 1

In related art example 1, a brand-new unused battery as a battery (e). In this example, charging was ended with the charging period of 4.4 hours. The charging rate in this case was 27% with respect to the rated capacity of the battery (e).

Related Art Example 2

In related art example 2, a battery, which had been used for 1000 cycles, was used, as a battery (f). In this example, charging was ended with the charging period of 6.7 hours. The charging rate in this case was 40% with respect to the rated capacity of the battery (f).

Related Art Example 3

In related art example 3, a battery, which had been used for 2000 cycles, was used as a battery (g). In this case, charging was ended with the charging period of 8.1 hours. The charging rate in this case was 34% with respect to the rated capacity of the battery (g).

Related Art Example 4

In related art example 4, a battery, which had been used for 3000 cycles, was used as a battery (h). In this case, charging was ended with the charging period of 7.0 hours. The charging rate in this case was 22% with respect to the rated capacity of the battery (h). In related art example 4, however, the threshold value S was not attained. Thus, it was determined that the battery had reached the end of life thereof.

A listing of test conditions and results of the above-mentioned embodiment examples and a listing of test conditions and results of the above-mentioned comparative examples are respectively shown in Table 1 and Table 2.

TABLE 1

| ITEM | EMBODIMENT EXAMPLE 1 BATTERY (a) | EMBODIMENT EXAMPLE 2 BATTERY (b) | EMBODIMENT EXAMPLE 3 BATTERY (c) | EMBODIMENT EXAMPLE 4 BATTERY (d) |
|---|---|---|---|---|
| BATTERY USED (CYCLE) | BRAND-NEW | 1000 | 2000 | 3000 |
| SET VOLTAGE (V) | 2.42 | 2.42 | 2.42 | 2.42 |
| THRESHOLD VALUE $S_0$ (CA) | 0.06 | 0.06 | 0.06 | 0.06 |
| THRESHOLD VALUE $S_1$ (CA) | 0.04 | 0.04 | 0.04 | 0.04 |
| THRESHOLD VALUE $S_2$ (CA) | 0.02 | 0.02 | 0.02 | 0.02 |
| THRESHOLD VALUE $S_m$ (CA) | 0.003 | 0.003 | 0.003 | 0.003 |
| MAXIMUM TIMER PERIOD $T_m$ (h) | 12.2 | 12.2 | 12.2 | 12.2 |
| ADDITIONAL TIMER PERIOD $T_1$ (h) | 11.8 | 11.8 | 11.8 | 11.8 |
| ADDITIONAL TIMER PERIOD $T_2$ (h) | 11.2 | 11.2 | 11.2 | 11.2 |
| TOTAL CHARGING PERIOD A (h) | 24 | 24 | 24 | 24 |
| CHARGING PERIOD (h) | 4.1 | 6.3 | 7.9 | 12.9 |
| CHARGING RATE (VS RATED CAPACITY) (%) | 28 | 38 | 33 | 23 |

TABLE 2

| ITEM | RELATED ART EXAMPLE 1 BATTERY (e) | RELATED ART EXAMPLE 2 BATTERY (f) | RELATED ART EXAMPLE 3 BATTERY (g) | RELATED ART EXAMPLE 4 BATTERY (h) |
|---|---|---|---|---|
| BATTERY USED (CYCLE) | BRAND-NEW | 1000 | 2000 | 3000 |
| SET VOLTAGE (V) | 2.42 | 2.42 | 2.42 | 2.42 |
| THRESHOLD VALUE S (CA) | 0.003 | 0.003 | 0.003 | 0.003 |
| CHARGING PERIOD $T_1$ (CA) | T × 1.0 | T × 1.0 | T × 1.0 | T × 1.0 |
| CHARGING PERIOD $T_2$ (CA) | T × 0.5 | T × 0.5 | T × 0.5 | T × 0.5 |
| TOTAL CHARGING PERIOD A (h) | — | — | — | — |
| CHARGING PERIOD (h) | 4.4 | 6.7 | 8.1 | 7.0 |
| CHARGING RATE (VS RATED CAPACITY) (%) | 27 | 40 | 34 | 22 |

FACTORS FOR THE CHARGING PERIOD T WERE SET $T_0$ 1.0 AND 0.5.
$T_2$ ARE REPEATED THREE TIMES AT MAXIMUM.
IN RELATED ART EXAMPLE 4, BATTERY WAS DETERMINED TO HAVE REACHED END OF LIFE THREOF BECAUSE S WAS NOT ATTAINED.

The above-mentioned results have revealed the followings:

Comparison between the battery (a) of embodiment example 1 and the battery (e) of comparative example 1 has proved that the charging in embodiment example 1 took less time than that in comparative example 1 though the batteries in the same condition were used and there was not much difference between the charging rates of embodiment example 1 and comparative example 1. That is, the comparison between the battery (a) of embodiment example 1 and the battery (e) of comparative example 1 has shown that, by performing refresh charging according to the present invention, the refresh charging comparable to that in the related art may be performed by simplified control and in a shorter period.

Comparison between the battery (b) of embodiment example 2 and the battery (f) of comparative example 2 has proved that the charging rate in the comparative example was slightly larger than that in embodiment example 2 though the batteries in the same condition were used. The charging in the comparative example, however, took more time than that in embodiment example 2. The comparison between the battery (b) of embodiment example 2 and the battery (f) of comparative example 2 has therefore shown that, according to the present invention, sufficient refresh charging may be performed while stopping the refresh charging earlier than that in the related art. The same advantage may be obtained also when the battery (c) in embodiment example 3 and the battery (g) in comparative example 3 are compared.

Comparison between the battery (d) of embodiment example 4 and the battery (h) of the related art example has proved that the charging in embodiment example 4 took more time than that in the related art example. The battery in related art example 4, however, was erroneously determined to have reached the end of life thereof though the battery was usable. Accordingly, the comparison between the battery (d) of embodiment example 4 and the battery (h) of related art example 4 has shown that, according to the present invention, determination of the end of life of the battery may be also appropriately made by simplified control.

In this embodiment, the refresh charging apparatus 15 is configured to include the direct-current power source 23 to perform refresh charging. The refresh charging apparatus may also be configured to use the solar battery SC as a power supply source. With this arrangement, when it is clear that fine weather will continue for a long period, the solar battery SC may be used to perform refresh charging, and the direct-current power source 23 may be used in the other cases.

Further, in this embodiment, a temperature sensor, not shown, is mounted on the battery case (lead-acid storage battery case) of a part of the lead-acid storage batteries constituting the assembled battery 5. Aside from the flowchart, the charging control circuit 25 constantly obtains temperature information from the temperature sensor and is configured to stop charging when a predetermined temperature is exceeded. This configuration is made to prevent thermal runaway of the battery due to abnormal heat generation. Though it is advisable to change the predetermined temperature according to an environment where the assembled battery is installed, the predetermined temperature in this embodiment is set to 50° C., for example. It is safer to mount the temperature sensor at a position of the lead-acid storage batteries constituting the assembled battery 5 on the upper side of the assembled battery 5 or the like where temperature is most likely to rise.

The above-mentioned Equation (1) that defines the relationship between the threshold value and the timer period is a preferred example, and may be suitably changed according to the type, the number of cells, or the like of the assembled battery to be refresh-charged. An experiment has confirmed that Equation (1) in this embodiment is in the following range in view of an error:

$$T_x = (0.9 \pm 0.05)\ln(S_x) + (14.7 \pm 0.05)$$

Alternatively, the timer period may be determined from the threshold value, using one of the following equations:

$$T_x = (31.0 \pm 0.05)S_x + (10.6 \pm 0.05)$$

$$T_x = (15.2 \pm 0.05)S_x^{0.0999}$$

$$T_x = (1208.8 \pm 0.05)S_x^2 + (102.5 \pm 0.05)S_x + (9.6 \pm 0.05)$$

The threshold values used above are also examples. Only one intermediate threshold value may be of course set, or two or more intermediate threshold values may be of course set.

It is so arranged that, when the abnormal condition is detected in each of steps ST80, ST140, ST200, ST240, and ST280 in this embodiment, the alarm signal is generated to stop charging. An arbitrary process may, however, be performed upon receipt of the alarm signal. When remote control is being performed, for example, an error may be of course notified to a remote location.

Figure 5:
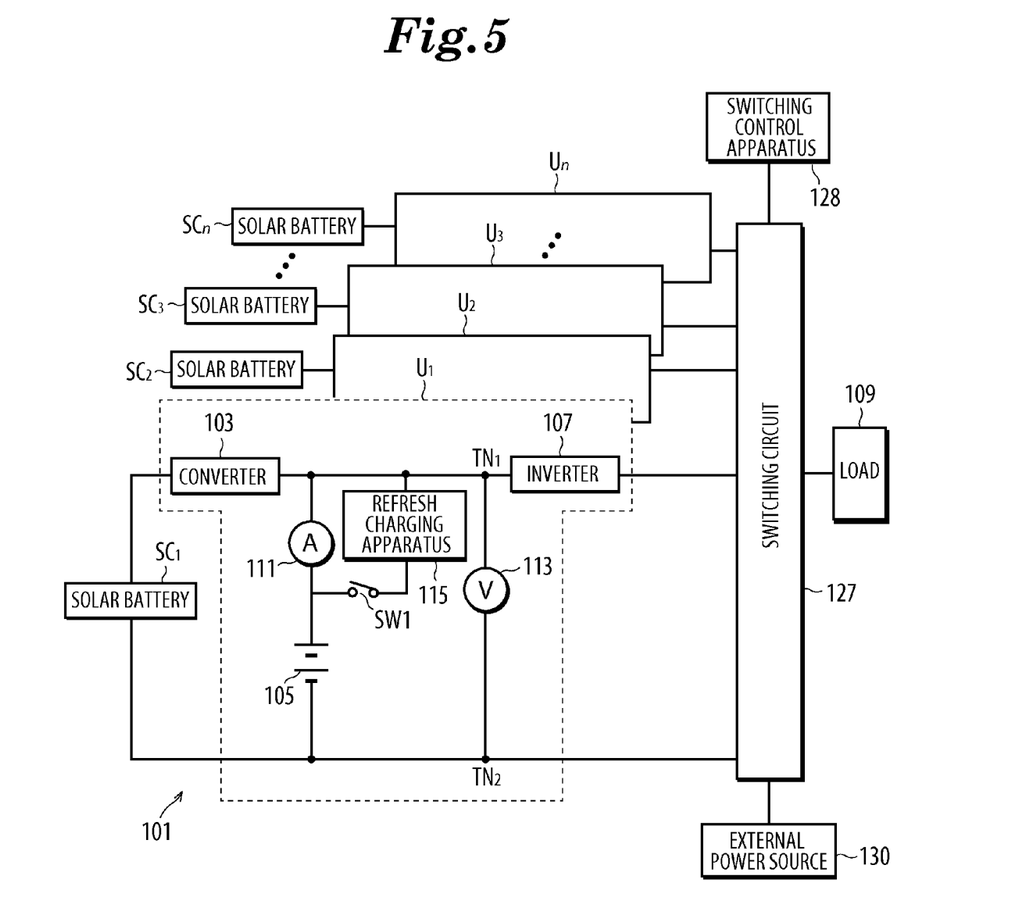
FIG. 5 is a circuit diagram showing a power generation system in a second embodiment into which the refresh charging apparatus of the present invention is incorporated.

FIG. 5 is a diagram showing a second embodiment of the present invention. Components in FIG. 5 that are the same as those in the embodiment shown in FIG. 1 are given reference numerals obtained by adding 100 to the reference numerals in FIG. 1, and description of the components in FIG. 5 which are the same as those in FIG. 1 will be omitted. In this embodiment, a system configured by combining solar batteries ($SC_1$, $SC_2$, $SC_3$, ..., and $SC_n$, hereinafter collectively referred to as "solar batteries SC") and battery units ($U_1$, $U_2$, $U_3$, ..., and U$_n$, hereinafter collectively referred to as "battery units U") is connected in parallel with a load 109 through a switching circuit 127 to constitute a power generation system 101. The switching circuit 127 performs a switching operation in response to a command from a switching control apparatus 128. Different from the first embodiment, each refresh charging apparatus 115 in this embodiment does not include a direct-current power source. Each refresh charging apparatus 115 functions as a charging control circuit. Each refresh charging apparatus 115 is connected to an assembled battery 105 through a switch SW1. Charging and discharging histories of each battery unit U, a date when refresh charging was performed at an immediately preceding time, and history information such as an SOC are also stored in each refresh charging apparatus 115. An inverter 107 to be used in this embodiment includes not only a function of converting direct current to alternating current but also a function of converting alternating current to direct current as a converter.

In this embodiment, one of the following three power sources may be used as a power supply source when refresh-charging an assembled battery 105:

(i) use of the solar battery SC connected to the assembled battery 105.

(ii) use of the assembled battery 105 of the battery unit U other than the assembled battery 105 to be refresh-charged.

(iii) use of an external power source 130.

The switching control apparatus 128 is configured to predict a power generation amount, stable power generation, a power generation start time, and like of the solar battery SC, based on weather information from a weather forecast company, to determine the order of refresh charging of each battery unit based on the histories of each battery unit U stored by each refresh charging apparatus 115, and then to allow selection of one of the three power sources mentioned in the items (i) to (iii) as the power supply source, by switching the switching circuit 127. The switching control apparatus 128 includes a function of outputting to each refresh charging apparatus 115 a start command to start refresh charging.

When it is clear that fine weather continues for a long period of time, for example, the switching control apparatus 128 disconnects one battery unit U necessary for refresh charging, and then uses the solar battery SC connected to the assembled battery 105 to perform refresh charging (in the case of the item (i)).

When a power generation amount cannot be expected because the weather is bad, the battery units U other than the battery unit U to be refresh-charged is used as the power supply source (in the case of the item (ii)). In this embodiment, the switching control apparatus 129 sets switching so that a ratio of the number of the battery units on a power supply side to the number of the battery units on a charging side is two to one so as to avoid shortage of electric power on an output side during refresh charging. When the assembled battery 105 of the battery unit U1 needs to be refresh-charged, for example, the battery units U2 and U3 are used as the power supply source. In this case, the switching control apparatus 128 electrically disconnects the battery units U1, U2, and U3 from the load 109 and switches the switching circuit 127 so that an alternating current output is supplied to the battery unit U1 from each of the battery units U2 and U3. Together with this switching, the refresh charging apparatus 115 of the battery unit U1 that has received the start command from the switching control apparatus 128 closes the switch SW1, thereby using the inverter 107 of the battery unit U1 as the converter for A/D conversion. Then, a direct current flows through the assembled battery 105 of the battery unit U1 using the battery units U2 and U3 as the power source, and refresh charging is thereby performed.

The external power source 130 is used (in the case of the item (iii)) when a power generation amount cannot be expected because the weather is bad, and refresh charging is urgently needed. In this case, the switching control apparatus 128 disconnects from the system the battery unit U including the assembled battery 105 for which the refresh charging is needed, and switches the switching circuit 127 to perform power supply from the external power source 130.

With this arrangement, the assembled battery 105 of the battery unit U may be refresh-charged using as little as possible of electric power of the external power source 130.

In the above-mentioned embodiments, the assembled battery is charged by an output of the solar battery. Even when a power generation source that operates by utilizing another natural energy is used, the present invention may be naturally applied.

INDUSTRIAL APPLICABILITY

According to the present invention, a refresh charging method and a refresh charging apparatus for an assembled battery constituted from lead-acid storage batteries may be obtained in which, before a maximum timer period elapses, it may be determined that sufficient charging is performed, and a necessary charging rate may be obtained in a shorter charging period. As a result, unnecessary power consumption for charging is eliminated. Further, the charging is controlled by a charging current and the charging period (timer). Thus, there is an effect that the need for complex control as in the prior art is eliminated.

REFERENCE SIGN LIST 1 power generation system
SC solar battery
3 converter
5 assembled battery
7 inverter
9 load
11 ammeter
13 voltmeter
15 refresh charging apparatus
17 charging circuit
19 ammeter
21 voltmeter
23 direct-current power source
25 charging control circuit

The invention claimed is:

1. A refresh charging method for an assembled battery constituted from a plurality of lead-acid storage batteries, configured to completely charge the assembled battery, the plurality of lead-acid storage batteries being generally used in a lower charged state than a fully-charged state when not undergoing refresh charging, the method comprising:

performing a constant current charging mode of charging the assembled battery with a constant current until a voltage of the assembled battery reaches a predetermined set voltage;

switching the charging mode from the constant current charging mode to a constant voltage charging mode;

performing the constant voltage charging mode operable to charge the assembled battery with a constant voltage when it is detected that the voltage of the assembled battery has reached the predetermined voltage; and stopping charging, in the constant voltage charging mode, when timer counting for a maximum timer period $T_m$ is completed or when it is detected that a charging current reaches a lower limit current value for the charging current lower than a predetermined threshold value $S_0$, wherein the timer counting for the maximum timer period $T_m$ is started after the charging current reaches the predetermined threshold value $S_0$; the maximum timer period $T_m$ is predetermined based on testing as a time period which can be estimated to be required to completely charge the assembled battery by continuing to charge the assembled battery even after the charging current has reached the predetermined threshold value $S_0$ on an assumption that each lead-acid storage battery in the assembled battery does not reach an end of life thereof; and the lower limit value for the charging current is predetermined based on testing as a current level at which it can be estimated that the lead-acid storage batteries are in a completely charged state, wherein:
in the constant voltage charging mode, n intermediate threshold values $S_1$ to $S_n$ which decrease stepwisely are set between the predetermined threshold value $S_0$ and the lower limit current value, n being an integer equal to or larger than one, and n additional timer periods $T_1$ to $T_n$ are set, counting of the n additional timer periods $T_1$ to $T_n$ being respectively started when the charging current reaches the n intermediate threshold values $S_1$ to $S_n$;

the n additional timer periods $T_1$ to $T_n$ are set to satisfy a relationship of $T_m > T_1 > \ldots > T_n$ as timer periods respectively estimated to be required for the lead-acid storage batteries to come into the completely-charged state when the charging is continued even after the charging current has reached the respective intermediate threshold values; and the charging is stopped when the counting of one of the maximum timer period $T_m$ and the n additional timer periods $T_1$ to $T_n$ is completed before the lower-limit current value is detected.

2. The refresh charging method for an assembled battery constituted from a plurality of lead-acid storage batteries according to claim 1, wherein:
when the predetermined threshold value $S_0$ and the n intermediate threshold values $S_1$ to $S_n$ are each indicated by a current value $S_x$ [CA] and the maximum timer period $T_m$ and the n additional timer periods $T_1$ to $T_n$ are each indicated by a period $T_x$ [h], the predetermined threshold value $S_0$, the n intermediate threshold values $S_1$ to $S_n$, the maximum timer period $T_m$, and the n additional timer periods $T_1$ to $T_n$ are defined to satisfy the following relational equation:

$$T_x = (0.9 \pm 0.05)\ln(S_x) + (14.7 \pm 0.05).$$

3. The refresh charging method for an assembled battery constituted from a plurality of lead-acid storage batteries according to claim 1, wherein
when the counting is started simultaneously with a start of the charging operation and then the charging operation is continued even after counting of a limit timer period longer than the maximum timer period $T_m$ set in advance has been completed, it is determined that one or more of the lead-acid storage batteries are in an abnormal condition, and an alarm signal is then generated.

4. The refresh charging method for an assembled battery constituted from a plurality of lead-acid storage batteries according to claim 1, wherein when a period taken for the charging current to reach the lower limit current value after the charging with the constant voltage has been started in the constant voltage charging mode is equal to or less than a minimum timer period shorter than each of the additional timer periods, it is determined that the lead-acid storage batteries have reached the ends of lives thereof, and an alarm signal is then generated.

5. The refresh charging method for an assembled battery constituted from a plurality of lead-acid storage batteries according to claim 1, further comprising preparing a temperature measuring device operable to measure a surface temperature of a battery case of at least one of the lead-acid storage batteries is provided, wherein
when the temperature measuring device measures a predetermined temperature, it is determined that the at least one of the lead-acid storage batteries are in an abnormal condition, and an alarm signal is then generated.

6. A refresh charging apparatus for an assembled battery constituted from a plurality of lead-acid storage batteries comprising a charging circuit configured to:
perform a constant current charging mode of charging the assembled battery with a constant current until a voltage of the assembled battery reaches a predetermined set voltage;
switch the charging mode from the constant current charging mode to a constant voltage charging mode;
perform the constant voltage charging mode operable to charge the assembled battery with a constant voltage when it is detected that the voltage of the assembled battery has reached the predetermined voltage; and
stop charging, in the constant voltage charging mode, when timer counting for a maximum timer period $T_m$ is completed or when it is detected that a charging current reaches a lower limit current value for the charging current lower than a predetermined threshold value $S_0$, wherein the timer counting for the maximum timer period $T_n$ is started after the charging current reaches the predetermined threshold value $S_0$; the maximum timer period $T_m$ is predetermined based on testing as a time period which can be estimated to be required to completely charge the assembled battery by continuing to charge the assembled battery even after the charging current has reached the predetermined threshold value $S_0$ on an assumption that each lead-acid storage battery in the assembled battery does not reach an end of life thereof; and the lower limit value for the charging current is predetermined based on testing as a current level at which it can be estimated that the lead-acid storage batteries are in a completely charged state, wherein:
in the constant voltage charging mode, n intermediate threshold values $S_1$ to $S_n$ which decrease stepwisely are set between the predetermined threshold value $S_0$ and the lower limit current value, n being an integer equal to or larger than one, and n additional timer periods $T_1$ to $T_n$ are set, counting of the n additional timer periods $T_1$ to $T_n$ being respectively started when the charging current reaches the n intermediate threshold values $S_1$ to $S_n$;
the n additional timer periods $T_1$ to $T_n$ are set to satisfy a relationship of $T_m > T_1 > \ldots > T_n$ as timer periods respectively estimated to be required for the lead-acid storage batteries to come into the completely-charged state when the charging is continued even after the charging current has reached the respective intermediate threshold values; and the charging is stopped when the counting of one of the maximum timer period $T_m$ and the n additional timer periods $T_1$ to $T_n$ is completed before the lower-limit current value is detected.

* * * * *